(12) United States Patent
Guenther et al.

(10) Patent No.: US 12,468,847 B2
(45) Date of Patent: *Nov. 11, 2025

(54) DATA PRIVACY MANAGEMENT (71) Applicant: Wells Fargo Bank, N.A., San Francisco, CA (US)

(72) Inventors: Damien Guenther, Newport, RI (US); Megan Klein, San Francisco, CA (US); Chris McClennen, Charlotte, NC (US); Joy Middleton-Saulny, Smyrna, GA (US); Kathleen Evelyn Senior, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,082

(22) Filed: Mar. 5, 2024

(65) Prior Publication Data

US 2024/0211630 A1    Jun. 27, 2024

Related U.S. Application Data (63) Continuation of application No. 17/087,212, filed on Nov. 2, 2020, now Pat. No. 11,954,225.

(51) Int. Cl.
*G06F 21/62*    (2013.01)

(52) U.S. Cl.
CPC ........ *G06F 21/6245* (2013.01); *G06F 21/629* (2013.01)

(58) Field of Classification Search
CPC ............................ G06F 21/6245; G06F 21/629
See application file for complete search history.

(56) References Cited

U.S. PATENT DOCUMENTS

| | | | |
|---|---|---|---|
| 6,072,248 A | 6/2000 | Muise et al. | |
| 6,253,203 B1 | 6/2001 | O'Flaherty et al. | |
| 7,011,164 B1 | 3/2006 | Breazeale | |
| 7,069,427 B2 | 6/2006 | Presler-Marshall et al. | |

(Continued)

FOREIGN PATENT DOCUMENTS

| | | |
|---|---|---|
| GB | 2343264 A | 5/2000 |
| WO | 9830421 A1 | 7/1998 |

OTHER PUBLICATIONS

George R. Milne and Andrew J. Rohm, "Consumer Privacy and Name Removal Across Direct Marketing Channels: Exploring Opt-In and Opt-Out Alternatives", ProQuest (Technology Collection Database, Dissertations and Theses Database): Technical Literature Search, Sep. 6, 2005.

(Continued)

*Primary Examiner* — David J Pearson
*Assistant Examiner* — Nega Woldemariam
(74) *Attorney, Agent, or Firm* — Merchant & Gould P.C.

(57) ABSTRACT

An example system places control and choice of managing the usage of private data into the hands of the users themselves. In some examples, the disclosed data privacy management system allows users to select preferences on how their private data is used by the business, both internally and externally. For example, the system may present users with one or more selectable options regarding how the user's private data is used. The system may then use the user's data for purposes that are in line with the user's selected preferences.

18 Claims, 9 Drawing Sheets

(56) References Cited

U.S. PATENT DOCUMENTS

| | | |
|---|---|---|
| 7,108,178 B1 | 9/2006 | Choi |
| 7,478,157 B2 | 1/2009 | Bohrer et al. |
| 7,533,113 B1 | 5/2009 | Haddad |
| 7,716,242 B2 | 5/2010 | Pae et al. |
| 7,720,750 B2 | 5/2010 | Brody et al. |
| 7,966,663 B2 | 6/2011 | Strickland et al. |
| 8,606,746 B2 | 12/2013 | Yeap et al. |
| 8,793,340 B2 | 7/2014 | Faure et al. |
| 8,893,297 B2 | 11/2014 | Eversoll et al. |
| 10,122,726 B2* | 11/2018 | Niemoeller ............ H04W 12/08 |
| 11,410,230 B1* | 8/2022 | Olson .................. G06F 21/6245 |
| 11,954,225 B1* | 4/2024 | Guenther ............ G06F 21/6245 |
| 2005/0044409 A1 | 2/2005 | Betz et al. |
| 2008/0055050 A1 | 3/2008 | Brown |
| 2010/0121773 A1 | 5/2010 | Currier et al. |
| 2011/0161172 A1 | 6/2011 | Lee |
| 2011/0214585 A1 | 9/2011 | Mendoza et al. |
| 2012/0066084 A1 | 3/2012 | Sneyders |
| 2012/0095838 A1 | 4/2012 | Broumand |
| 2013/0185806 A1* | 7/2013 | Hatakeyama ........... H04L 63/20 726/27 |
| 2014/0244399 A1 | 8/2014 | Orduna et al. |
| 2014/0288998 A1 | 9/2014 | Paray |
| 2015/0326522 A1 | 11/2015 | Pu et al. |
| 2015/0379303 A1 | 12/2015 | Lafever et al. |
| 2018/0307859 A1 | 10/2018 | Lafever et al. |
| 2019/0037077 A1 | 1/2019 | Konig et al. |
| 2019/0080113 A1* | 3/2019 | Kim .................... G06F 21/6245 |
| 2019/0108353 A1* | 4/2019 | Sadeh .................. H04L 67/306 |
| 2019/0253431 A1 | 8/2019 | Atanda |
| 2020/0007579 A1 | 1/2020 | Barday et al. |
| 2020/0045519 A1* | 2/2020 | Raleigh .................. H04W 4/08 |
| 2020/0117824 A1 | 4/2020 | Upadhyay et al. |
| 2020/0159960 A1* | 5/2020 | Jakobsson ........... G06F 21/6245 |
| 2020/0314133 A1* | 10/2020 | Singh .................... G06F 21/604 |
| 2020/0320220 A1 | 10/2020 | Beno et al. |
| 2020/0380171 A1* | 12/2020 | Bonat .................. G06F 21/604 |
| 2020/0410131 A1* | 12/2020 | Barday .................. G06F 11/34 |
| 2021/0200899 A1* | 7/2021 | Brannon ............. G06F 21/6245 |
| 2021/0312086 A1 | 10/2021 | Kim et al. |
| 2022/0083610 A1* | 3/2022 | Gilliam ................ G06F 16/957 |
| 2023/0161900 A1* | 5/2023 | Boutros ................ G06F 3/0482 726/27 |
| 2023/0214521 A1* | 7/2023 | Amico ................. G06Q 50/265 726/1 |

OTHER PUBLICATIONS

R. Bansal, "Cutting to the Chase", "IEEE Microwave Magazine, vol. 6, No. 1, pp. 36-41 Located via Compendex", Mar. 31, 2005. http://dx.doi.org/10.1109/MMW.2005.1417991.

I. Sample, "Police test hi-tech zapper that could end car chases", The Gardian, Jul. 11, 2004.

* cited by examiner

USER DATA DELETION PREFERENCES 702

704 → "DELETE ME" FROM THE FOLLOWING APPLICATION(S):

706
- APPLICATION A ☐
- APPLICATION B ☒
- APPLICATION C ☒

708 → HOW OFFEN SHOULD THE "DELETE ME" PROCESS BE EXECUTED?

710
- ○ ONE-TIME
- ◉ PERIODICALLY

Every:
| Day |
| Week |
| 2 Weeks |
| Month |
| 3 Months |
| 6 Months |
| Year |

712

SEND REPORT ← 714

DATA PRIVACY MANAGEMENT

BACKGROUND

In today's digital economy, where businesses collect and manage increasing amounts of user data, data privacy and data ethics are emerging concerns. Transparency in how businesses collect user data and manage the data that they have collected is essential in building trust and accountability with users and partners who expect privacy. The developing landscape of data protection laws and regulations, including the California Consumer Privacy Act (CCPA) of 2018, is also increasingly requiring businesses to provide consumers with greater visibility into how their data is handled.

SUMMARY

Embodiments of the disclosure are directed to providing users with greater control on how their data is handled by businesses.

In a first embodiment, a method implemented on an enterprise electronic computing device to allow a user to manage the usage of data associated with the user comprises: sending a selectable data privacy preference option to a user electronic computing device, wherein the data privacy preference option is associated with the usage of the user's data by one or more applications; receiving an election associated with the data privacy preference option from the user electronic computing device; storing the received election in a data store; receiving a request from one of the one or more applications for data associated with a plurality of users; retrieving the data associated with the plurality of users from a plurality of data sources; based on the stored election, determining whether the user elected to allow the one of the one or more applications access to the user's data; upon determining that the user elected to not allow the one of the one or more applications access to the user's data, filtering the data associated with the plurality of users to exclude the user's data; and sending the data to the one of the one or more applications.

In another embodiment, an enterprise electronic computing device comprises: a processing unit; and system memory, the system memory including instructions which, when executed by the processing unit, cause the enterprise electronic computing device to: cause a user electronic computing device to display a selectable data privacy preference option to a user, wherein the data privacy preference option is associated with the usage of the user's data by one or more applications; receive an election associated with the data privacy preference option; store the received election in a data store; receive a request from one of the one or more applications for data associated with a plurality of users; retrieve the data associated with the plurality of users from a plurality of data sources; based on the stored election, determine whether the user elected to allow the one of the one or more applications access to the user's data; upon determining that the user elected to not allow the one of the one or more applications access to the user's data, filter the data associated with the plurality of users to exclude the user's data; and send the data to the one of the one or more applications.

In yet another embodiment, a financial institution electronic computing device comprises: a processing unit; and system memory, the system memory including instructions which, when executed by the processing unit, cause the financial institution electronic computing device to: receive identification information associated with a user from a user electronic computing device; authenticate the user based on the received identification information; cause the user electronic computing device to display three or more selectable data privacy preference options, wherein: each of the one or more data privacy preference options is associated with the usage of the user's data by one or more applications; one of the three or more selectable data privacy options includes an option to allow one or more of the applications access to the user's data or to deny one or more of the applications access to the user's data one of the three or more selectable data privacy options includes an option to request to view a portion or all of the user data that was collected by one or more of the applications; one of the three or more selectable data privacy options includes an option to request to delete a portion or all of the user data that was collected by the one or more applications associated with the financial institution; receive an election associated with each of the three or more data privacy preference options; store the each of the received elections in a data store; receive a request from a requesting application for data associated with a plurality of users, wherein the requesting application is one of the one or more applications; retrieve the data associated with the plurality of users from a plurality of data sources; based on the stored elections, determine whether the user elected to allow the requesting application access to the user's data; upon determining that the user elected to not allow the requesting application access to the user's data, filter the data associated with the plurality of users to exclude the user's data; and send the data to the requesting application.

The details of one or more techniques are set forth in the accompanying drawings and the description below. Other features, objects, and advantages of these techniques will be apparent from the description, drawings, and claims.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

The present disclosure relates to allowing users to manage how businesses use their private data.

Data ethics and data privacy are emerging themes across all industries. In a world where more and more data is available and used to drive business decisions and opportunities, the expectations of users, the regulatory landscape, the social and political environment are forcing businesses to take a much harder look at not only what businesses "can" we do with data, but what businesses "should" we do with data. As privacy laws continue to grow and become more consumer-centric, there is a need for businesses to reevaluate their approach to data privacy and security.

Users do not always understand what data businesses collect and how the collected data is used by the business. Different users have different perspectives on what they consider to be acceptable use of their private data. While some users may be comfortable with broad use of their private data as long as there is some value to themselves, and may even be willing to provide additional data if there was a good reason to do so, other users may be hypersensitive to their data footprint and have firm expectations that their private data is collected minimally and only used to manage specifically requested services. One approach to data privacy that businesses should consider is to allow the users to decide what is acceptable or ethical use of their private data.

This disclosure places control and choice of managing the usage of private data into the hands of the users themselves. In some examples, the disclosed technology allows users to select preferences on how their private data is used by the business, both internally and externally. For example, the disclosed technology may present users with one or more selectable options regarding how the user's private data is used. The technology may then use the user's data for purposes that are in line with the user's selected preferences.

In this manner, the disclosed technology limits an enterprise from using the user's private data in certain manners, such as from being used to create a marketing offer. Such technology gives users a higher level of transparency and control over what happens to their private data.

The technology described herein exhibits a practical application in that it provides a more efficient way to manage private data. The disclosed user interfaces provide an efficient manner for displaying the private data and options to manipulate that data. The systems and methods that are implemented herein thereby provide the technical advantage of managing this private data in a better, more transparent way.

Figure 1:
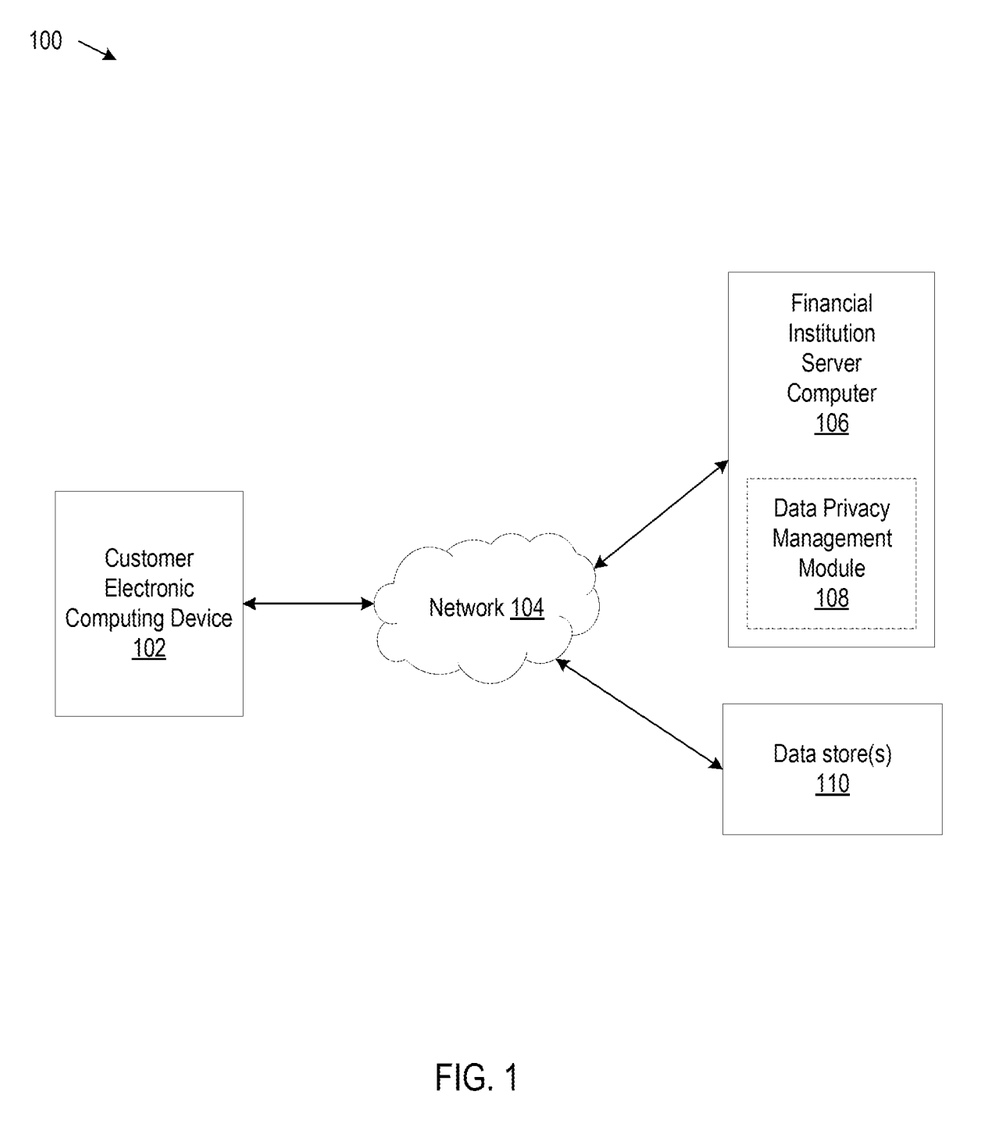
FIG. 1 illustrates an example system that supports the management of user private data.

FIG. 1 illustrates an example system 100 that supports the management of user private data. The system 100 includes a user electronic computing device 102, a network 104, a financial institution server computer 106 and one or more datastores 110. In some examples, the financial institution server computer 106 may include a data privacy management module 108. More, fewer or different modules can be used.

In some examples, user electronic computing device 102 is an electronic computing device of the user. In some examples, the electronic computing device can be a desktop computer, a laptop computer, virtual reality user device, a mobile electronic computing device such as a smartphone or a tablet computer. The electronic computing device permits the user to access the financial institution server computer 106 over a network 104.

Although a single user electronic computing device 102 is shown, the system 100 allows hundreds, thousands, or more computing devices to connect to the financial institution server computer 106.

In some examples, the network 104 is a computer network, such as the Internet. The user on user electronic computing device 102 can access the financial institution server computer 106 via the network 104.

In a preferred example, the financial institution server computer 106 is a server computer of a financial institution, such as a bank. Although a single server is shown, in reality, the financial institution server computer 106 can be implemented with multiple computing devices, such as a server farm or through cloud computing. Many other configurations are possible.

A user may be anyone with one or more accounts at the financial institution. Examples of such accounts include, without limitation, checking accounts, savings accounts, credit card accounts, certificates of deposit, mortgages, etc. In some examples, the user may or may not be a customer of the financial institution and may or may not use or subscribe to one or more products of the financial institution.

In one example, the data privacy management module 108 can allow a user to control how the user's private data is used by the financial institution both internally and externally. As discussed in more detail later herein, the data privacy management module 108 presents the user with one or more options related to data privacy preferences. Upon receiving data privacy preference selections from the user, the data privacy management module 108 stores the preferences of the user. The stored preferences are later used by the data privacy management module 108 to filter data that is provided to one or more integrated applications 302 such that the user private data usage is in compliance with the preferences of the user. The one or more integrated applications 302 are described in further detail in relation to FIG. 3.

The example datastore 110 may include one or more electronic databases that can store user private data and/or user data privacy preferences. The datastore 110 may be maintained by the financial institution itself or one or more external enterprises for the financial institution. The datastore 110 can be accessed by financial institution server computer 106 to retrieve relevant data associated with the user as well as to retrieve user data privacy preferences.

Figure 2:
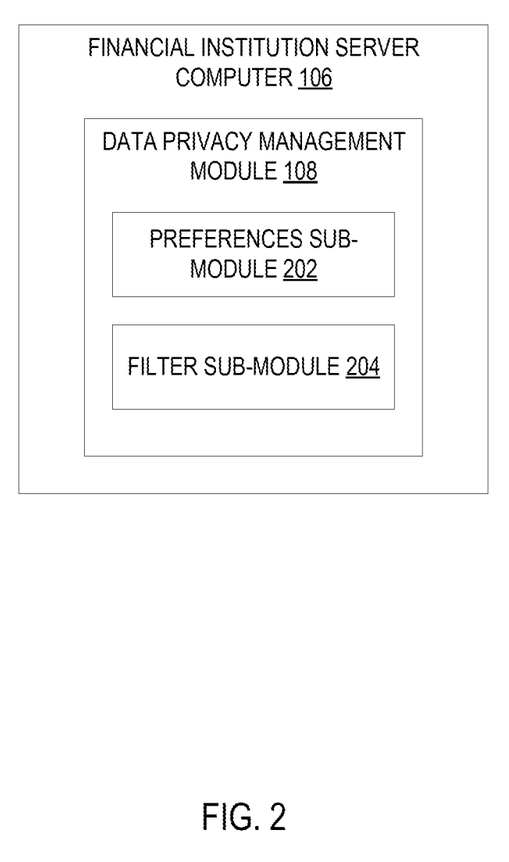
FIG. 2 illustrates an example configuration of the financial institution server computer of the system of FIG. 1, including an example implementation of the data privacy management module.

FIG. 2 illustrates an example configuration of the financial institution server computer 106 including an example implementation of the data privacy management module 108. As detailed in relation to FIG. 1, the financial institution server computer 106 includes the data privacy management module 108, which in turn may be implemented using one or more sub-modules.

In some examples, the disclosed data privacy management module 108 may manage receiving the user's preferences regarding the privacy of the user's data, storing the user's preferences, filtering the user private data accessed by one or more of the integrated applications 302 so as to ensure that the data usage is in compliance with user's data privacy preferences.

In some examples, the data privacy management module 108 comprises a preferences sub-module 202 and a filter sub-module 204. More or fewer sub-modules may also be used to implement the data privacy management module 108.

In some examples, the preferences sub-module 202 can manage the displaying of one or more data privacy options, receiving of the user's selections associated with the data privacy options and storing the user's selections in a data store. The preferences sub-module 202 is described in further detail in relation to FIG. 3.

In some examples, the filter sub-module 204 can manage the user private data accessed by one or more integrated applications 302 associated with the financial institution. The management of user private data may include correlating the data requested by the one or more integrated applications 302 as associated with one or more users of the financial institution, identifying the stored data privacy preferences of each of the users, based on the identified data privacy preferences, filtering a subset or all of the data associated with the one or more users before providing the requested user private data to the one or more integrated applications 302. The filter sub-module 204 is described in further detail in relation to FIG. 3.

Figure 3:
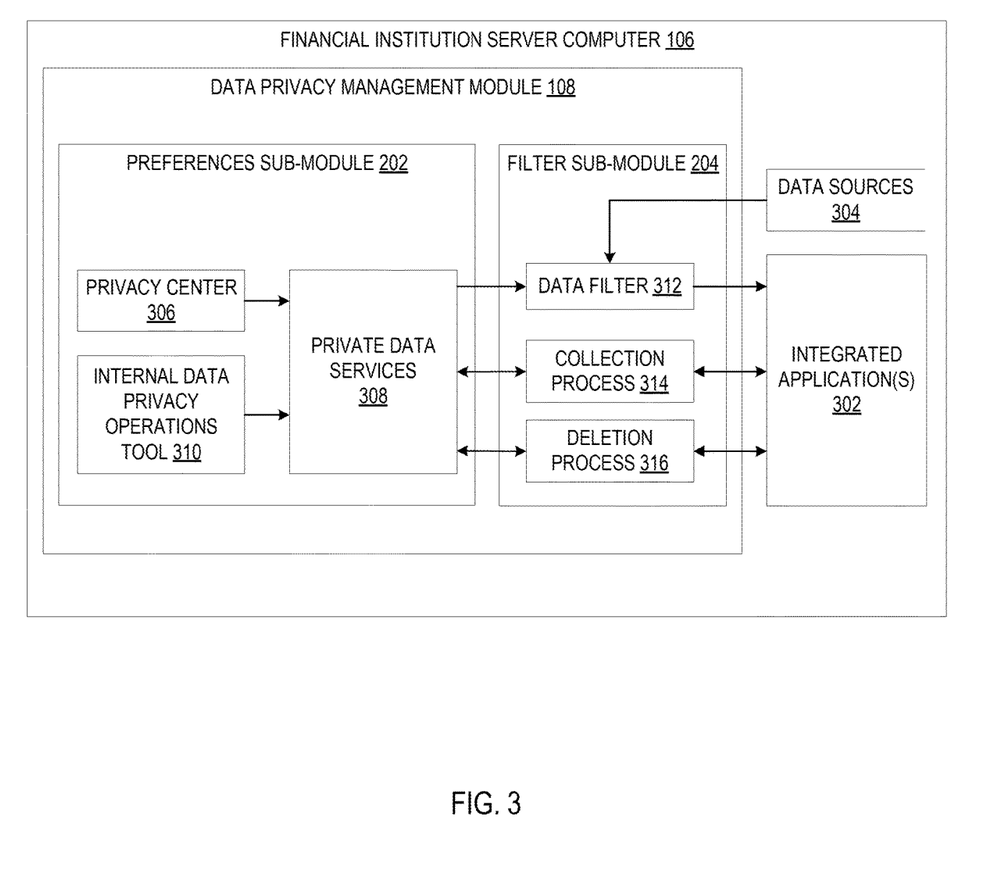
FIG. 3 illustrates additional details of the data privacy management module of FIG. 2.

FIG. 3 illustrates another example configuration of the financial institution server computer 106 including another example implementation of the data privacy management module 108. As described in relation to FIG. 2, the data privacy management module 108 may include a preferences sub-module 202 and a filter sub-module 204. The system 100 may also include one or more integrated applications 302 that retrieves data, including user private data, from one or more data sources 304.

In some examples, one or more integrated applications 302 may be configured within the financial institution server computer 106. In other examples, one or more of the integrated applications 302 may be configured in another computing system that is communicatively connected with the financial institution server computer 106. Each of the one or more integrated applications 302 can be a program or piece of software that is designed and written to fulfill a particular purpose of the financial institution. In the disclosed example, the one or more integrated applications 302 are internal application, meaning that the applications are developed and executed with a purpose that benefits the financial institution itself. In other examples, the integrated applications 302 may be developed for other purposes as well.

Each of the integrated applications 302 are configured to receive data from a plurality of data sources 304 as necessitated by the purpose or type of the integrated application 302 itself. The plurality of data sources 304 may include internal or external data sources. An internal data source is one that is directly or indirectly managed by the financial institution server computer 106. An external data source is one that is outside the control of the financial institution server computer.

Typically, each of the one or more integrated applications 302 request and receive user related data directly from the plurality of data sources 304. The disclosed system disrupts the flow of data directly from the data sources 304 to the one or more integrated applications 302 and instead redirects the flow of data from the plurality of data sources to a data filter 312 configured within the disclosed data privacy management module 108 so that user private data can be filtered according to the user's data privacy preferences before being received by the one or more integrated applications 302. The configuration of the data privacy management module 108 is described in further detail below.

In some examples, the preferences sub-module 202, configured within the data privacy management module 108, may include a privacy center 306, private data services 308, and an internal data privacy operations tool 310. In one example, privacy center 306 may be a webpage of the financial institution for users to make privacy requests and manage data privacy preferences associated with the user's private data. In some examples, the user may open the financial institution's website and navigate to the privacy center 306 webpage after completing a user authentication process. The privacy center 306 may include a user interface, further described in relation to FIGS. 4, 5, 6 and 7, where the user may view the one or more data privacy options presented to the user. The user may then select to "opt in" or "opt out" of allowing the usage of the user's private data for each of the purposes presented in the one or more data privacy preference options.

In some examples, the user private data can include any data related to the user, such as the user's name, address, phone number, birthdate, age, gender, marital status, family members, whether the user has children, social security number, type of financial products the user uses, financial account balances, whether the user has a retirement fund, whether the user has college funds, how often the user logs into their financial account, unique identifier associated with the user, etc. Other types of user data are also possible.

In some examples, each of the one or more data privacy preferences presented to the user may be associated with a type of data. For example, the data privacy preferences can include options for the user to opt in or opt out of allowing one or more integrated applications 302 to use data based on the type of data, such as: all data regarding account balances or all demographic data associated with the user, etc. Other options are also possible.

In other examples, each of the one or more data privacy preferences presented to the user may be associated with one or more purposes or integrated applications 302. For example, the data privacy preferences can include options for the user to opt in or opt out of allowing use of the user's private data for marketing applications or artificial intelligence or machine learning applications, etc. Other options are also possible.

In some examples, the data privacy preferences may also include a "show me" request or a "delete me" request. For example, selecting a "show me" request may include enabling processes to identify in-scope private data and its business use and supporting integration activities to provide the data to the user making the request. In other words, selecting a "show me" option on the privacy center 306 may allow the user to view the private data of the user that are used by one or more of the integrated applications 302.

Selecting a "delete me" request may include enabling processes to delete private data associated with the user making the request where appropriate. In some examples, a "delete me" request may require a review of business use of the data, legal requirements, or record retentions policies. In some examples, a "delete me" request may include archived and historical data, while other examples may deem archived and historical data out of scope from the request.

In some examples, the "show me" and "delete me" preferences may be a one-time request. In other examples, the "show me" and "delete me" preferences may be a periodic request, where the user may require the disclosed system to delete private data associated with the user from all or selected number of the one or more integrated applications 302 at a selected time interval or the user may require the disclosed system to generate a report including a list of how, where and when the user's private data was used by the one or more integrated applications 302.

In some examples, the privacy center may receive the user's selections regarding the user's data privacy preferences and transmit the preference information to the private data services 308 for storage.

In some examples, the preferences sub-module 202 may also include private data services 308. In one example, the private data services 308 may include one or more data stores, such as databases, that manage requests and aggregate responses from the one or more integrated applications 302. In other examples, the private data services 308 may also store the data privacy preferences. In yet another example, the private data services 308 may also store and communicate the "show me" and "delete me" preferences to the one or more integrated applications 302.

In some examples, upon receiving the data privacy preferences selected by the user from the privacy center 306, the private data services 308 may associate the data privacy preferences with a user identifier and store the preferences. The user identifier may be a globally unique identifier (GUID) or another way of uniquely identifying the user. The GUID may be a number or alphanumeric code that is generated and associated with the user or some pre-existing information that is unique to the user, such as a social security number, a phone number, etc. Other identifiers such as the user's name, an account number, a driver's license number, etc. can also be used as a user identifier.

In addition to storing the data privacy preferences, the private data services 308 also manages direct and indirect requests from the one or more integrated applications 302 and filter sub-module 204. For example, the private data services 308 may receive a request for data privacy preferences associated with particular user or subset of users or "show me" or "delete me" preferences associated with a particular user or a subset of users. In some examples, the received requests may include the user identifier information to help identify the user or users whose data privacy preference information is needed.

In response to receiving a request, the private data services 308 may identify the requested information, based on the user identifier, retrieve the information and transmit the requested information to the requestor.

In some examples, the preferences sub-module 202 may also include an internal data privacy operations tool 310. The internal data privacy operations tool 310 may provide workflow management and support for back office processes, such as identity verification. For example, the privacy center 306 may require a user authentication process as an initial step before the data privacy preferences of the user can be received and associated with the user.

In some examples, the user authentication process may include receiving a username and password from the user and temporarily storing the received username and password in the private data services 308. The internal data privacy operations tool 310 may then access the stored username and password information and verify whether the information matches the information on record. Upon verifying the entered authentication information, the internal data privacy operations tool 310 may communicate a message that the user has been authenticated to the privacy center 306 directly or through the private data services 308 and the privacy center 306 may subsequently allow the user to navigate to the user's account information or privacy settings webpage.

In some examples, the filter sub-module 204, configured within the data privacy management module 108, may include a data filter 312, a collection process 314 and a deletion process 316. In some examples, a filter sub-module 204 may be implemented for each of the one or more integrated applications 302. Other ways of implementing the filter sub-module 204 are also possible.

In some examples, the data filter 312 may be configured to exclude the sourcing of data for users that have set their data privacy preference to "opt out" of the type of usage the associated integrated application 302 necessitates. In other words, the data filter 312 may receive user data from one or more data sources 304 based on a request from one of the one or more integrated applications 302. The data filter 312 may then filter out or exclude user data that belongs to users who have chosen for their data to not be used by the particular integrated application 302. The rest of the user data, data belonging to users who have "opted in" for their data to be used by the particular integrated application 302, may then be transmitted to and received by the integrated application 302 for analysis.

In some examples, after receiving user data from a plurality of data sources 304, the data filter 312 analyzes the received data and organizes by user and associates the user's user identifier information with the data. In some examples, the plurality of data may itself organize user data based on user identifier information. In other examples, particularly when user data is received from external sources, the data filter 312 may need to analyze the data in order to correlate the data to a particular user and then associate the particular user's user identifier with the analyzed data.

For example, the user data from an external data source may be organized by the user's birthdate. In such a case the data filter 312, may need to compare the different user data fields of the received data to the user data saved in the private data services 308 before concluding that the data belongs to a particular user. In one example, the received data may belong to a John Smith with a birthdate of Jan. 1, 1980. The data filter 312 may need to analyze the birthdate of all financial institution users and narrow down the list of users to everyone with a birthdate of Jan. 1, 1980. The list can then be narrowed down using the name field or other fields until there is a high likelihood that the received data belongs to a particular financial institution user. When such a conclusion is made, the received data is associated with the user identifier associated with the particular financial institution user.

In a non-limiting example to illustrate the method of operation of the data filter 312, a user ("John H. Smith") may have entered a preference on the privacy center 306 for their user data to not be used for marketing-related applications. In such an example, the user's private information may be stored like the following.

| GUID | Name | Birthdate | Account No. | Privacy flag 1 |
|---|---|---|---|---|
| 1234567890 | John H. Smith | Aug. 1, 1980 | 9876543210 | Y |

This schema illustrates that the example data stored for John H. Smith includes GUID, Birthdate, Account No. and Privacy flag1 information. In the above example, only one privacy flag, related to whether the user opted in or opted out of usage of the user's data for non-essential marketing purposes. However, in other example schemas, single privacy flag may be used to store whether the user opted in or opted out of usage of any of the user's data for any non-essential purposes. In yet other example schemas, a plurality of privacy flags may be stored for the user, wherein each of the plurality of flags relates to whether the user opted in or opted out of usage of the user's data for a particular non-essential purpose or in association with a particular non-essential application. Other example schemas may store additional data associated with the user, such as address, phone number, etc.

When an integrated marketing application, an application that analyzes data from a plurality of users to create marketing offers, requests a plurality of internal and external data sources 304 for user data regarding financial products that are popular with users in general and popular with financial institution users in particular, the plurality of data sources may compile and transmit the requested data associated with a plurality of users to the data filter 312.

The data filter 312 may analyze the received data and correlate the data to user identifiers. The data filter 312 may then communicate with the private data services 308 to verify, based on the unique user identifier information associated with users, whether any of the user data that was received from the plurality of data sources 304 belongs to any of the financial institution users who have opted out of usage of their data for marketing purposes or in marketing applications. When an overlap is identified, the user data belonging to the user who has selected a preference to opt out of usage of their data in marketing applications, is eliminated. After the filtering process is completed, the leftover user data is sent to the integrated marketing application for analysis.

In some examples, the filter sub-module 204 may include a collection process 314. In one example, when a user selects a "show me" option in the privacy center 306, the user's selected preferences may be stored in the private data services 308. An example user interface displaying the "show me" preferences to the user is described in detail in relation to FIG. 6.

The private data services 308 may then request the collection process 314 to identify any of the user's private data that have been used by the one or more integrated applications 302. The request may include different parameters based on the preferences selected by the user. For example, the parameters can include options on whether all integrated applications 302 or a subset of the integrated applications are to be checked for user data usage, whether the request is a one-time request or periodic request, the time frame for which the user data usage is to be checked etc. Other options are also possible.

For example, the collection process 314 may interact with all or a subset of the integrated applications 302, based on the user's preferences, and may make requests to each of the all or subset of the integrated applications 302 to identify any user data belonging to the requesting user that the application has used during a time frame selected by the user. The user data may be identified as belonging to the requesting user based on the user identifier information. Other ways of identifying the user data are also possible.

After receiving reports back from each of the integrated applications 302 regarding usage of the requesting user's data, the collection process 314 may collect the data and compile the information into a single report that is easy for the user to understand. The report may be displayed on the user interface display and/or sent to the user via electronic messaging, email, via printed copy of the report sent through the mail, etc. Other ways of presenting the data to the user are also possible.

In some examples, the filter sub-module 204 may include a deletion process 316. In one example, when a user selects a "delete me" option in the privacy center 306, the user's selected preferences may be stored in the private data services 308. An example user interface displaying the "delete me" preferences to the user is described in detail in relation to FIG. 7.

The private data services 308 may then request the deletion process 316 to identify and delete any or a subset of the user's private data that have been used by the one or more integrated applications 302. The request may include different parameters for the identifying and deleting data based on the preferences selected by the user. For example, the parameters may include options on whether all integrated applications 302 or a subset of the integrated applications 302 are to be checked for user data, whether the request is a one-time request or a periodic request, etc. Other options are also possible.

For example, the deletion process 316 may interact with all or a subset of the integrated applications 302, based on the user's preferences, and may make requests to each of the all or subset of the integrated applications 302 to identify any user data belonging to the requesting user that the integrated application 302 has stored. The user data may be identified as belonging to the requesting user based on the user identifier information. Other ways of identifying the user data are also possible.

In some examples, the deletion process may send a request to each of the integrated applications 302 identified by the user to delete any user data was identified by the application as belonging to the requesting user. The deletion process 316 may also request each of the integrated applications 302 to produce a summary report indicating what user data was stored or used by the application and status of the data after deletion process is completed. A single report compiling the deletion information from each of the integrated applications 302 may then be provided to the user through the user interface, or be sent to the user through electronic messaging, email or printed copies in the mail.

Figure 4:
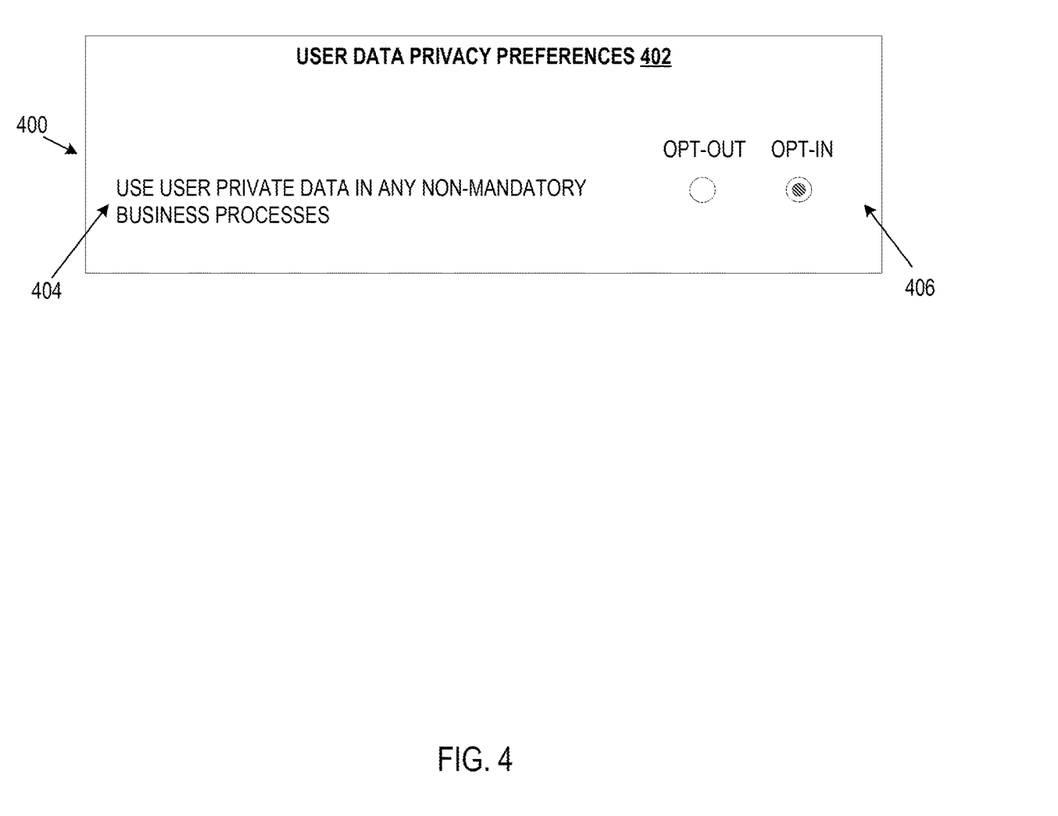
FIG. 4 illustrates an example user interface display of the data privacy management module of FIGS. 2 and 3 displaying user data privacy preferences.

FIG. 4 illustrates an example user interface display of the user data privacy preferences.

FIG. 4 illustrates an example user interface display 400 of the user data privacy preferences 402 which includes a general option 404 to either opt-in or opt-out of the user's private data being used for any any/all non-mandatory processes.

In the disclosed example, the user interface display 400 includes an "opt-in" or "opt-out" option 406 for the user to select from, based on the user's preferences. In some examples, the "opt-in" or "opt-out" options 406 may be displayed as radio buttons, where the user may only be able to select either to "opt-in" or "opt-out." In other examples, the options 406 may be presented as a toggle switch, drop down menu, a single check box, etc. Other selection options are also possible.

In the disclosed example, the user interface display 400 illustrates an "opt-in" or "opt-out" option 406 where the "opt-in" option is selected. In some examples, the "opt-in" option may be selected as the default option, whereby a user wanting to opt-out of all user private data usage for any non-mandatory processes can do so by selecting the "opt-out" option. In other examples, the default option may be the "opt-out" option and the user may need to make a selection of the "opt-in" option in order to opt to allow usage of the user's private data for non-mandatory processes. Other examples are also possible.

Figure 5:
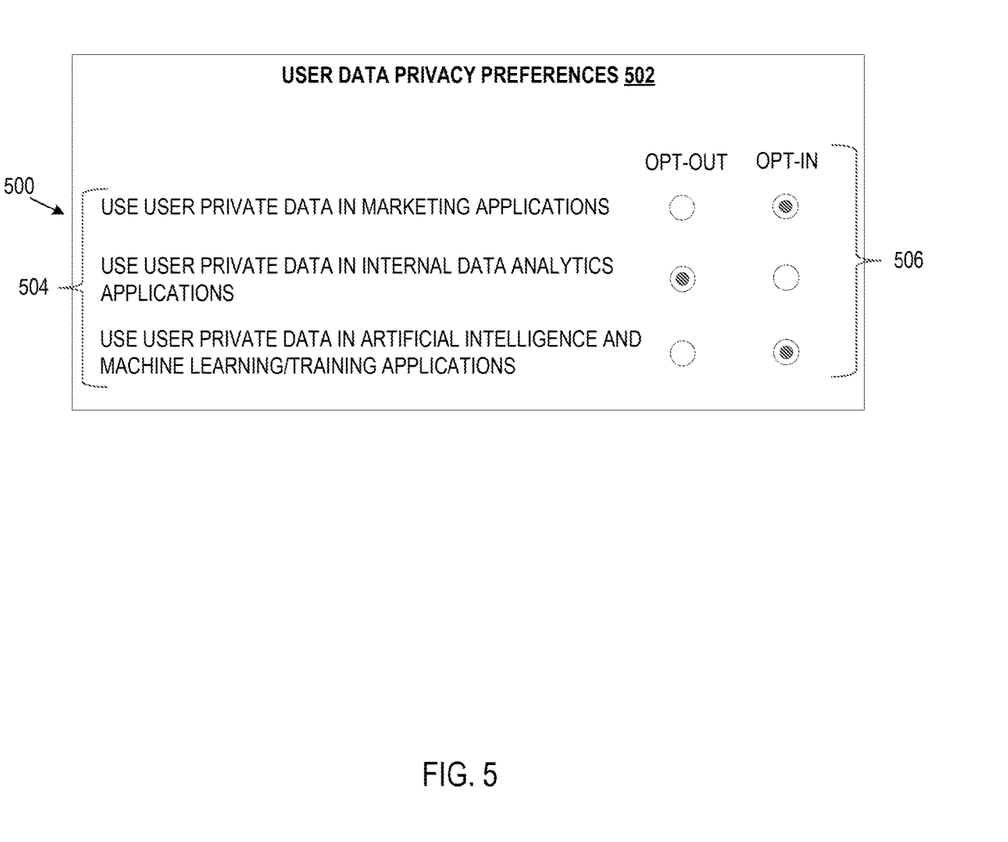
FIG. 5 illustrates another example user interface display of the data privacy management module of FIGS. 2 and 3 displaying user data privacy preferences.

FIG. 5 illustrates another example user interface display of the user data privacy preferences.

FIG. 5 illustrates an example user interface display 500 of the user data privacy preferences 502 which provides the user with a plurality of options 504 to either opt-in or opt-out of the user's private data being used in association with one or more integrated applications 302. In the disclosed example from FIG. 5, the plurality of options available to the user include: "use user private data in marketing applications," "use user private data in internal data analytics applications" and "use user private data in artificial intelligence and machine learning/training applications." In other examples, the user may be presented with options to select the purpose for which their user data is used rather than the specific applications for which the data is used. Other ways of selecting how the user data is used or not used are also possible.

In the disclosed example, the user interface display 500 illustrates an "opt-in" or "opt-out" option 506 for the user to select from, based on the user's preferences. Similar to the description above in relation to FIG. 4, the options 506 may also be displayed as radio buttons, or as toggle switches, drop down menus, check boxes, etc. Other selection options are also possible.

In the disclosed example, the user interface display 500 illustrates and "opt-in" or "opt-out" options 506, where the "opt-in" option is selected for the use of user private data in marketing applications and in artificial intelligence and machine learning/training application and "opt-out" is selected for use of user private data in internal data analytics applications. Similar to the description above in relation to FIG. 4, in some examples, the options 506 may use the "opt-in" option as the default preference and in other examples, the "opt-out" may be used as the default preference.

Figure 6:
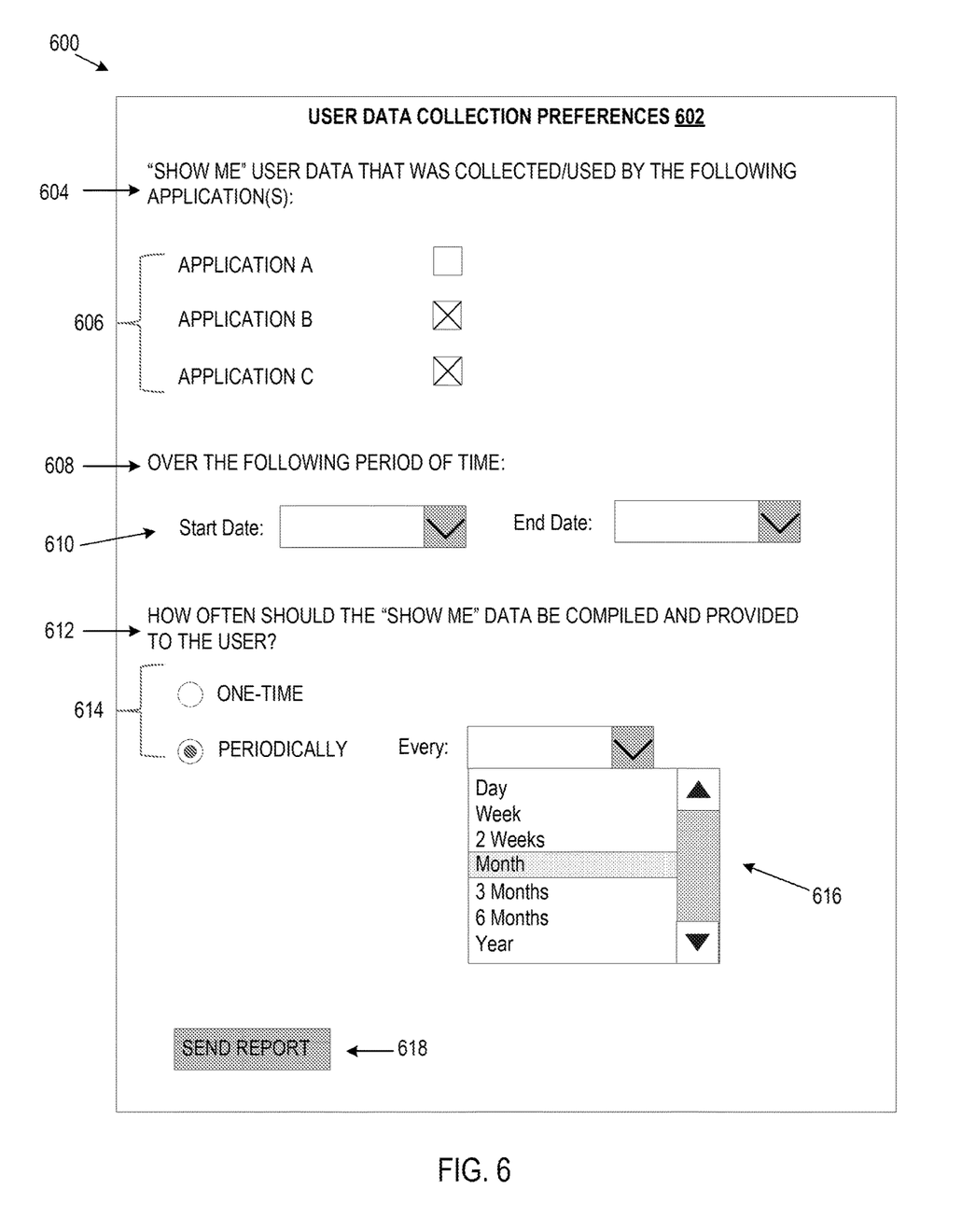
FIG. 6 illustrates an example user interface display of the data privacy management module of FIGS. 2 and 3 displaying user data collection preferences.

FIG. 6 illustrates an example user interface display 600 of the user data collection preferences 602. In some examples, the user interface display 600 may include a selection preference 604 where the user can select which of the applications to collect the user's usage data from. For example, the selection preference 604 may display a list 606 of all or a subset of the applications that are associated with the financial institution. The user may then select one or more of the applications as the applications whose usage data is to be analyzed for use of the user' private data. In some examples, each application on the list 606 may include a selection option adjacent to it that can be selected or de-selected to indicate a selection of the associated application as being relevant to the "show me" query from the user. In some example, the selection option adjacent to the list 606 may be in the form of a check box. In other examples, radio buttons, drop-down menus and toggle switches can also be used. In yet other examples, other types of selection options can also be used.

In some examples, the user interface display 600 may include a selection preference 608 where the user can select the time frame over which the user's private data usage information is to be compiled from the one or more applications selected from the list 606. For example, selection preference 608 may display a start date and end date drop down menu options 610 for the user to select the period over which the user's private data usage information is to be compiled. Although the disclosed example illustrates the menu options 610 as drop-down menus, other types of selection options may also be used.

In some examples, the user interface display 600 may also include a selection preference 612 where the user can select how often the user's private data usage information should be compiled and provided to the user. For example, the selection preference 612 may display frequency options 614 for the user to select from. In the disclosed example, the frequency options 614 may include an option to compile and provide the user with the user' private data usage information one time or periodically. In the disclosed example, the frequency options 614 are provided as radio buttons so that the user may choose either the "one-time" option or the "periodically" option. However, other types of selection options may also be possible.

In some examples, when the user selects the "periodically" option for the frequency options 614, the user may be provided with an additional periodic option 616 to choose the frequency at which the user's private data usage information may be compiled and provided to the user periodically. In the disclosed example, the periodic option 616 may be presented as a drop-down menu where the user may pick between options: day, week, 2 weeks, month, 3 months, 6 months or year. However other types of selection options, as well as more or fewer options, may be provided for the user to choose from.

In some examples, the user data collection preferences 602 may also include a button 618 to send a report of the user's private data usage information to the user or a third party. For example, the compiled report may be sent via email, electronic message and printed document that is sent to the user's address. Other options are also possible.

Figure 7:
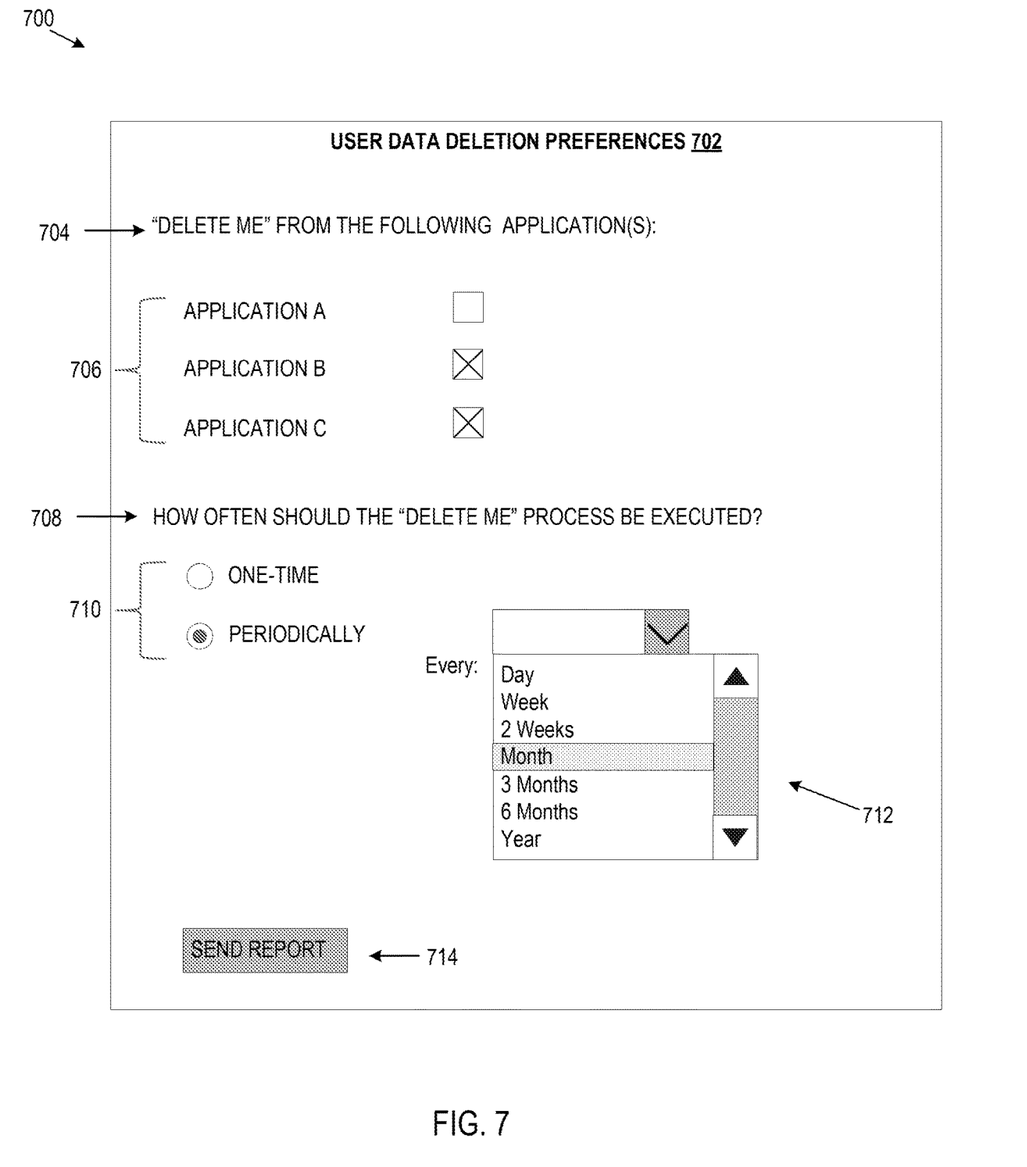
FIG. 7 illustrates an example user interface display of the data privacy management module of FIGS. 2 and 3 displaying user data deletion preferences.

FIG. 7 illustrates an example user interface display 700 of the user data deletion preferences 702. In some examples, the user interface display 700 may include a selection preference 704 where the user can select which of the applications to delete the user's private data from. For example, the selection preference 704 may display a list 706 of all or a subset of the applications that are associated with the financial institution. The user may then select one or more of the applications as the applications whose usage data is to be analyzed for use of the user' private data, which may subsequently be deleted. In some examples, each application on the list 706 may include a selection option adjacent to it that can be selected or de-selected to indicate a selection of the associated application as being relevant to the "delete me" query from the user. In some examples, the selection option adjacent to the list 706 may be in the form of a check box. In other examples, radio buttons, drop-down menus and toggle switches can also be used. In yet other examples, other types of selection options can also be used.

In some examples, the user interface display 700 may also include a selection preference 708 where the user can select how often the user's private data is to be deleted from the one or more integrated applications 302. For example, the selection preference 708 may display frequency options 710 for the user to select from. In the disclosed example, the frequency options 710 may include an option to delete the user' private data from the applications selected from the list 706 one time or periodically. In the disclosed example, the frequency options 710 are provided as radio buttons so that the user may choose either the "one-time" option or the "periodically" option. However, other types of selection options may also be possible.

In some examples, when the user selects the "periodically" option for the frequency options 710, the user may be provided with an additional periodic option 712 to choose the frequency at which the user's private data usage information may be deleted. In the disclosed example, the periodic option 712 may be presented as a drop-down menu where the user may pick between options: day, week, 2 weeks, month, 3 months, 6 months or year. However other types of selection options, as well as more or fewer options, may be provided for the user to choose from.

In some examples, the user data deletion preferences 702 may also include a button 714 to send a report of the user's private data that was deleted from the selected application to the user or a third party. For example, the compiled report may be sent via email, electronic message and printed document that is sent to the user's address. Other options are also possible.

Figure 8:
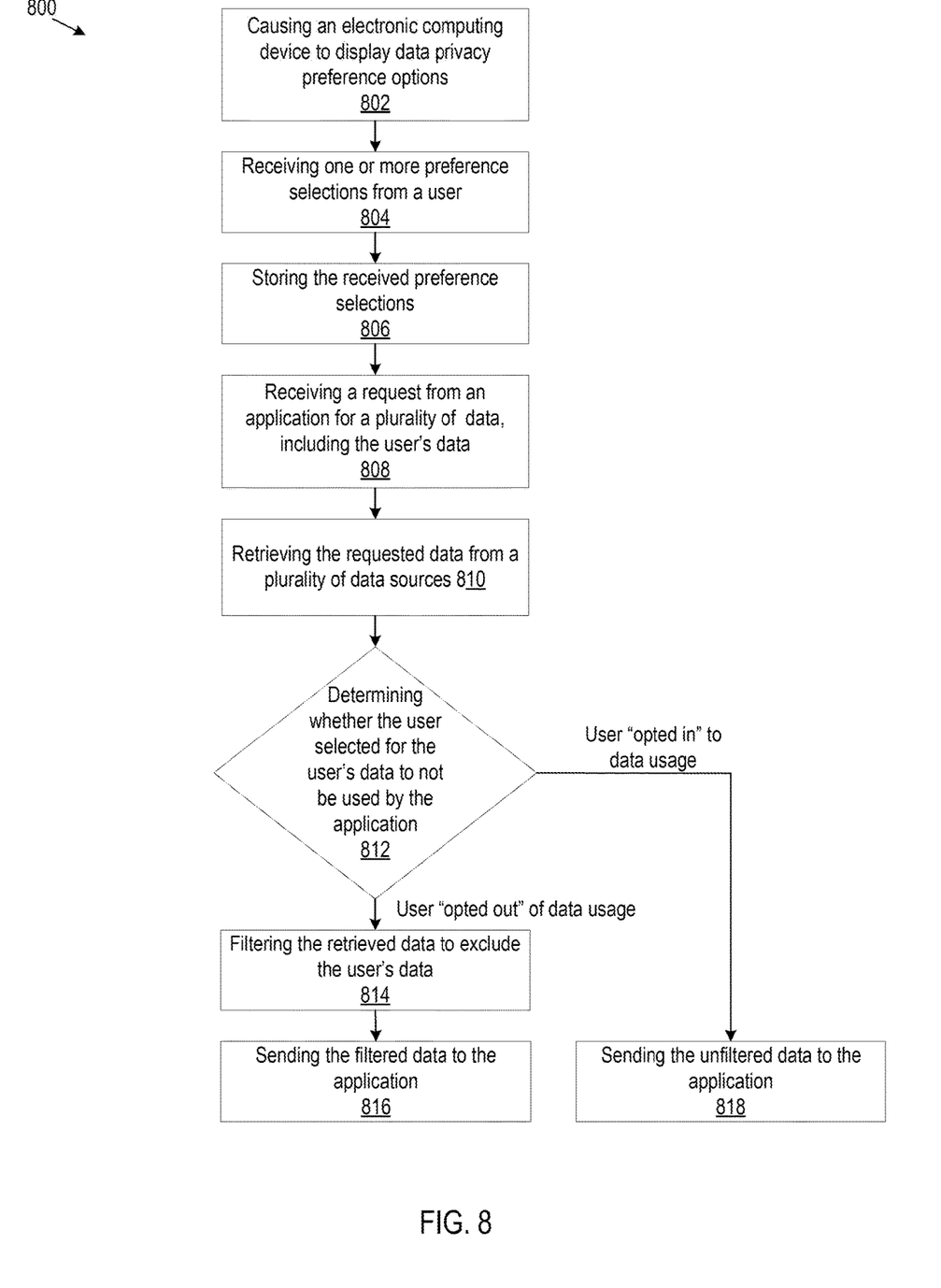
FIG. 8 illustrates a flowchart of an example method for managing usage of user's private data.

FIG. 8 illustrates a flowchart of an example method for managing usage of user's private data. The method 800 can be implemented on the financial institution server computer 106.

At operation 802, the financial institution server computer 106 causes the user's electronic computing device to display data privacy preference options. For example, the user may log in to a financial institution webpage or application and upon successfully authenticating the user, the user may be presented with a plurality of options, including a webpage for the user to select one or more data privacy preference options. Upon navigating to the webpage, the financial institution server computer 106 causes the user's electronic computing device to display one or more selectable data privacy preference options.

At operation 804, the financial institution server computer 106 receives one or more data privacy preference option selections from the user. For example, in operation 802, the user may be presented with one or more data privacy preference options for the user to select from. The one or more options provide the user with the opportunity to select whether the user want to allow one or more applications access to the user's private data. In some examples, the preference options may be based on the type of application. In other examples, the preference options may be based on the purpose for which the user' private data would be used. In all cases, the user may select whether to "opt in" to or "opt out" of allowing access to the user's private data. The user's selections associated with each of the one or more preference options are received by the financial institution server computer 106.

At operation 806, the received selections are stored in a data store. In some examples, the data store may be a database. For example, the user's selections may be associated with a unique user identifier number before being stored in a data store for easy retrieval later on.

At operation 808, the financial institution server computer 106 receives a request from one or more applications for a plurality of data. For example, the one or more applications may be internal applications that are associated with the financial institution and may have access to user data for all users associated with the financial institution. The one or more applications may include marketing applications, internal data analytics applications, artificial intelligence and machine learning/training applications, etc. Other applications are also possible.

At operation 810, the financial institution server computer 106 retrieves and organizes the requested data from a plurality of internal and external data sources. In some examples, upon retrieving the requested data associated with a plurality of users, the financial institution may correlate each piece of data with a user and associate the unique user identifier of the user with the piece of data. Other ways of organizing the data and tying the data to particular users is also possible.

At operation 812, the financial institution server computer 106 may make a determination of whether the retrieved data includes any data belonging to a user that has indicated that the usage of their private data be restricted to one or more of the applications. For example, the determination can be made by correlating data tied to a user identifier with the stored preference selections associated with the user with the same user identifier information in operations 804 and 806.

At operation 814, upon determining that a user "opted out" of the usage of their data by an application, the financial institution server computer 106 may filter the retrieved data to exclude the user's private data before sending the filtered data to the requesting application in operation 816.

Alternatively, at operation 818, upon determining that a user "opted in," which may also be the default position, to the usage of their data by an application, the financial institution server computer 106 may send the unfiltered retrieved data to the requesting application.

Figure 9:
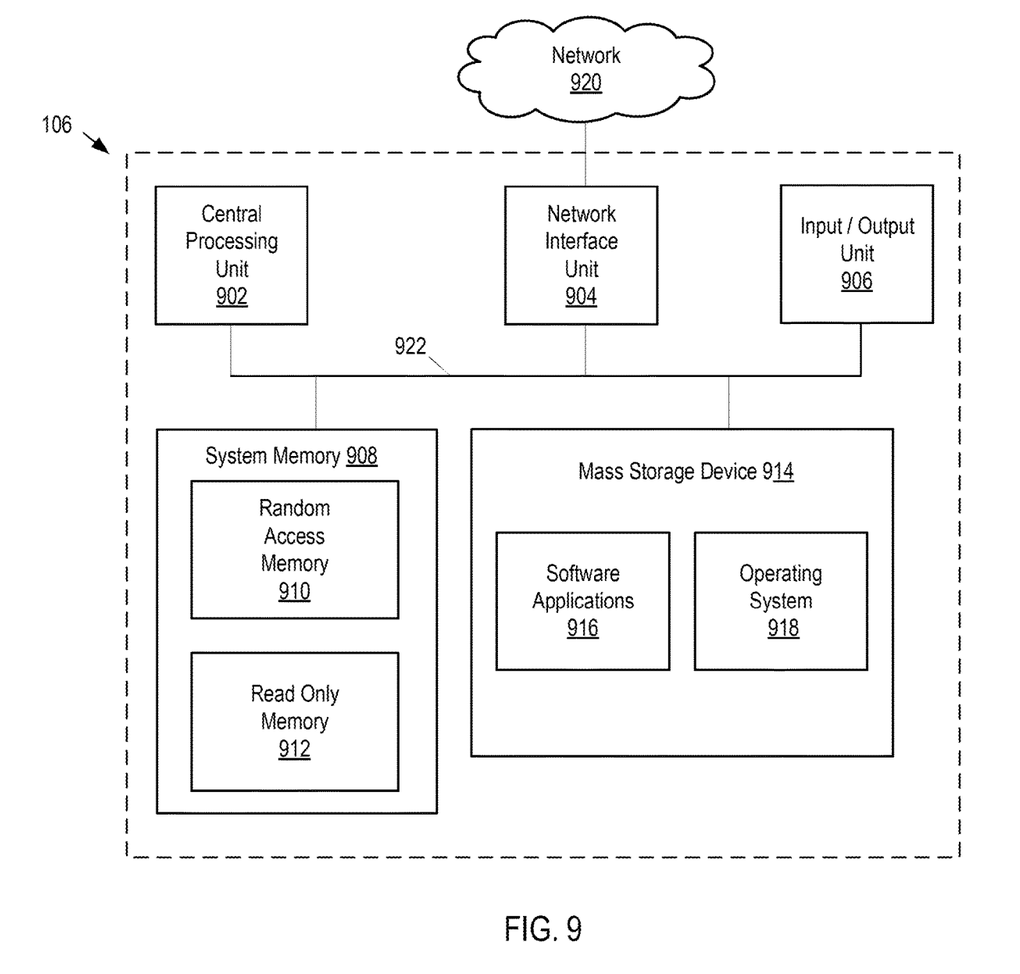
FIG. 9 illustrates example physical components of the electronic computing devices of FIG. 1.

As illustrated in the example of FIG. 9, financial institution server computer 106 includes at least one central processing unit ("CPU") 902, a system memory 908, and a system bus 922 that couples the system memory 908 to the CPU 902. The system memory 908 includes a random-access memory ("RAM") 910 and a read-only memory ("ROM") 912. A basic input/output system that contains the basic routines that help to transfer information between elements within the financial institution server computer 106, such as during startup, is stored in the ROM 912. The financial institution server computer 106 further includes a mass storage device 914. The mass storage device 914 is able to store software instructions and data, including software applications 916 and an operating system 918. Some or all of the components of the financial institution server computer 106 can also be included in user electronic computing device 102.

The mass storage device 914 is connected to the CPU 902 through a mass storage controller (not shown) connected to the system bus 922. The mass storage device 914 and its associated computer-readable data storage media provide non-volatile, non-transitory storage for the financial institution server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 106.

According to various embodiments of the invention, the financial institution server computer 106 may operate in a networked environment using logical connections to remote network devices through the network 920, such as a wireless network, the Internet, or another type of network. The financial institution server computer 106 may connect to the network 920 through a network interface unit 904 connected to the system bus 922. It should be appreciated that the network interface unit 904 may also be utilized to connect to other types of networks and remote computing systems. The financial institution server computer 106 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the financial institution server computer 106 can store software instructions and data. The software instructions include one or more software applications 916. The software instructions can also include an operating system 918 suitable for controlling the operation of the financial institution server computer 106. The mass storage device 914 and/or the RAM 910 also store software instructions, that when executed by the CPU 902, cause the financial institution server computer 106 to provide the functionality of the financial institution server computer 106 discussed in this document. For example, the mass storage device 914 and/or the RAM 910 can store software instructions that, when executed by the CPU 902, cause the financial institution server computer 106 to display received data on the display screen of the financial institution server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device to manage data associated with a user, the method comprising:
   sending a selectable data privacy preference option to a user electronic computing device, wherein the selectable data privacy preference option is associated with a usage of a user's data by a plurality of applications, and wherein the selectable data privacy preference option includes:
      an option to deny at least one of the plurality of applications access to the user's data;
      a display listing the plurality of applications with a selectable option for sending a user data usage report adjacent thereto, wherein the selectable option is associated with each of the plurality of applications; and
      a control to allow for a frequency selection from a plurality of frequencies for sending of the user data usage report;
   receiving an election associated with the selectable data privacy preference option from the user electronic computing device;
   storing the election in a data store;
   receiving a request from an application of the plurality of applications for data associated with a plurality of users;
   retrieving the data associated with the plurality of users from a plurality of data sources;
   based on the election, determining whether the user elected to deny the application access to the user's data;
   upon determining that the user elected to deny the application access to the user's data, generating filtered data by filtering the data associated with the plurality of users to exclude the user's data; and
   upon receiving selection of the selectable option of at least one of the plurality of applications, requesting the at least one of the plurality of applications to periodically compile and send the user data usage report according to the frequency selection with at least a portion of the user's data collected by the at least one of the plurality of applications.

2. The method of claim 1, further comprising:
   sending the filtered data to the application.

3. The method of claim 1, wherein the option further includes a selection to allow at least one of the plurality of applications access to the user's data.

4. The method of claim 3, further comprising:
   upon determining that the user elected to allow the application access to the user's data, sending the data, including the user's data, to the application.

5. The method of claim 1 further comprising:
   associating the election with a user identifier that is unique to the user.

6. The method of claim 1, wherein the option is one among a plurality of options.

7. The method of claim 1, wherein the display further includes a selection of a start date and end date to view the portion of the user's data that was collected by the plurality of applications between the start date and end date.

8. The method of claim 6, wherein the plurality of options further includes:
   a third option to request to periodically delete the portion or all of the user's data that was collected by the plurality of applications.

9. The method of claim 1, wherein the user's data includes one or more of: name, date of birth, social security number, phone number, address, marital status, salary, financial products purchased by the user, financial account balances, purchase history, deposit and withdrawal history, account number for each of the user's financial accounts and a unique user identifier.

10. An electronic computing device, comprising:
    a processing unit; and
    system memory, the system memory including instructions which, when executed by the processing unit, cause the electronic computing device to:
       send a selectable data privacy preference option to a user electronic computing device, wherein the selectable data privacy preference option is associated with a usage of a user's data by a plurality of applications, and wherein the selectable data privacy preference option includes:
          an option to deny at least one of the plurality of applications access to the user's data;
          a display listing the plurality of applications with a selectable option for sending a user data usage report adjacent thereto, wherein the selectable option is associated with each of the plurality of applications; and
          a control to allow for a frequency selection from a plurality of frequencies for sending of the user data usage report;
       receive an election associated with the selectable data privacy preference option from the user electronic computing device;
       store the election in a data store;
       receive a request from an application of the plurality of applications for data associated with a plurality of users;
       retrieve the data associated with the plurality of users from a plurality of data sources;
       based on the election, determine whether the user elected to deny the application access to the user's data;

upon determining that the user elected to deny the application access to the user's data, generate filtered data by filtering the data associated with the plurality of users to exclude the user's data; and upon receiving selection of the selectable option of at least one of the plurality of applications, request the at least one of the plurality of applications to periodically compile and send the user data usage report according to the frequency selection with at least a portion of the user's data collected by the at least one of the plurality of applications.

11. The electronic computing device of claim 10, wherein the instructions further cause the electronic computing device to:

send the filtered data to the application.

12. The electronic computing device of claim 10, wherein the option further includes a selection to allow at least one of the plurality of applications access to the user's data.

13. The electronic computing device of claim 12, further comprising:

upon determining that the user elected to allow the application access to the user's data, send the data, including the user's data, to the application.

14. The electronic computing device of claim 10, wherein the instructions further cause the electronic computing device to:

associate the election with a user identifier that is unique to the user.

15. The electronic computing device of claim 10, wherein the option is one among a plurality of options.

16. The electronic computing device of claim 10, wherein the display further includes a selection of a start date and end date to view the portion of all of the user's data that was collected by the plurality of applications between the start date and end date.

17. The electronic computing device of claim 15, wherein the plurality of options further includes:

a third option to request to periodically delete the portion or all of the user's data that was collected by the plurality of applications.

18. The electronic computing device of claim 10, wherein the user's data includes one or more of: name, date of birth, social security number, phone number, address, marital status, salary, financial products purchased by the user, financial account balances, purchase history, deposit and withdrawal history, account number for each of the user's financial accounts and a unique user identifier.

* * * * *